W. L. PATTERSON.
UNITARY DISSOLVING VIEW PROJECTION APPARATUS.
APPLICATION FILED MAY 22, 1917.
1,254,724.
Patented Jan. 29, 1918.
2 SHEETS—SHEET 1.
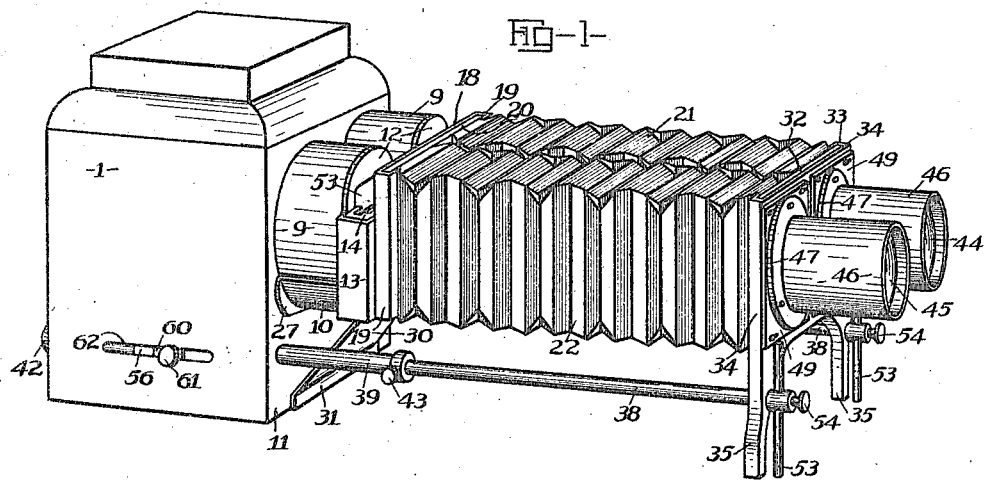
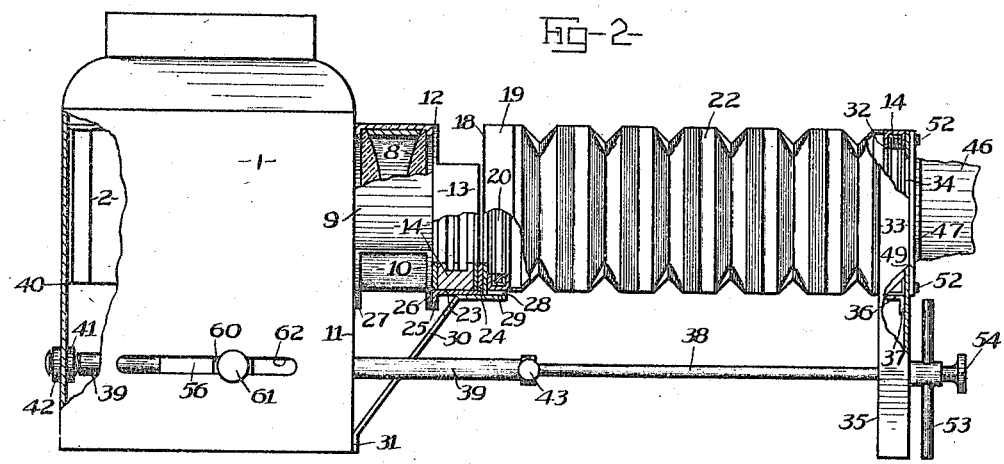
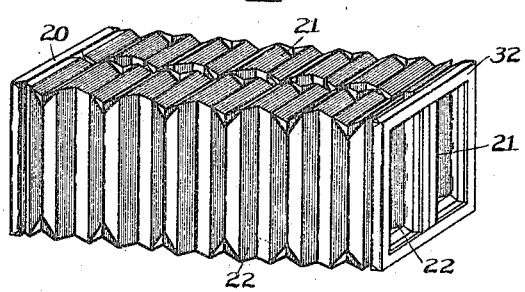
INVENTOR
William L. Patterson
BY
his ATTORNEYS W. L. PATTERSON.
UNITARY DISSOLVING VIEW PROJECTION APPARATUS.
APPLICATION FILED MAY 22, 1917.
1,254,724.
Patented Jan. 29, 1918.
2 SHEETS—SHEET 2.
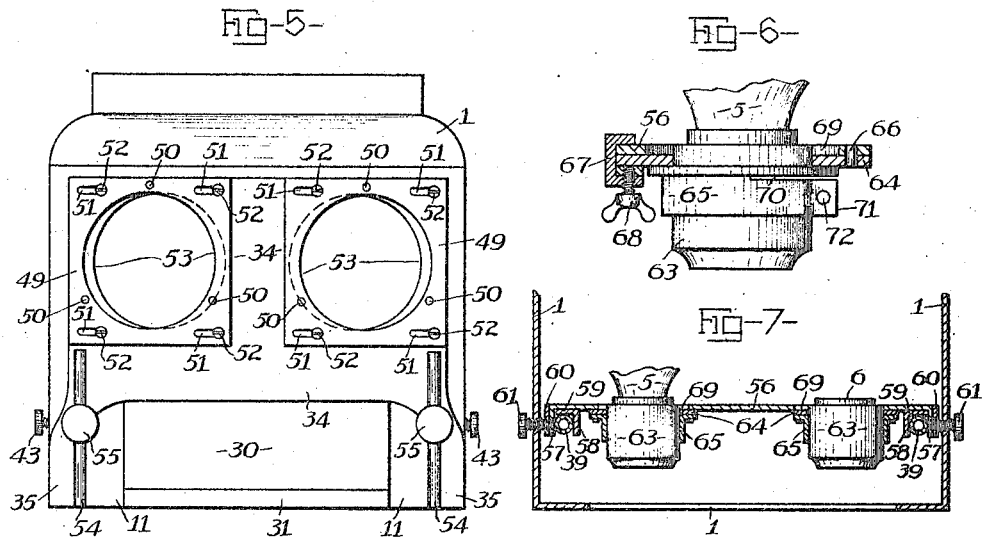
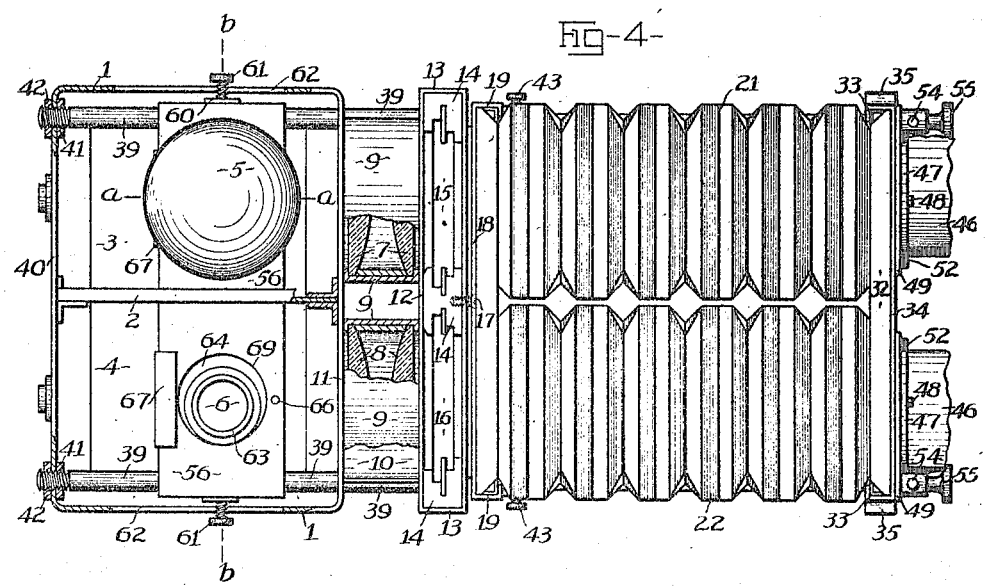
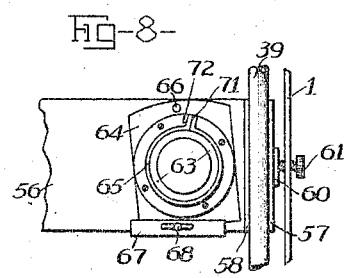
INVENTOR
William L. Patterson
BY
Church & Rich
his ATTORNEYS

UNITED STATES PATENT OFFICE.

WILLIAM L. PATTERSON, OF ROCHESTER, NEW YORK, ASSIGNOR TO BAUSCH & LOMB OPTICAL COMPANY, OF ROCHESTER, NEW YORK, A CORPORATION OF NEW YORK.

UNITARY DISSOLVING-VIEW PROJECTION APPARATUS.

1,254,724.            Specification of Letters Patent.      Patented Jan. 29, 1918.

Application filed May 22, 1917. Serial No. 170,275.

*To all whom it may concern:*

Be it known that I, WILLIAM L. PATTERSON, a citizen of the United States, residing at Rochester, in the county of Monroe, State of New York, have invented certain new and useful Improvements in Unitary Dissolving-View Projection Apparatus; and I do declare the following to be a full, clear, and exact description of the same, reference being had to the accompanying drawings, forming a part of this specification, and to the characters of reference marked thereon.

This invention relates more especially to dissolving view projection apparatus of the type in which the dissolving effect is produced by alternate lighting and extinguishment of two light sources coacting with two picture or object slide supporting chambers, and two objectives adapted to project illuminated images of the pictures or objects upon a screen.

The invention has for its object to promote simplicity, lightness and durability of construction and thereby reduce the cost of apparatus of this class, and to make their most effective operation easy for both amateurs and experts, and to give a distinctively pleasing appearance to the entire projector.

The invention will first be described and then will be particularly set forth in the appended claims.

In the drawings:

Figure 1 is a perspective view of the improved projection apparatus. Fig. 2 is a side elevation of the projector partly broken away and in section. Fig. 3 is a perspective view of the duplex bellows of the projector. Fig. 4 is a plan view of the projector with the lamp house top and one of the two lamp bulbs removed and with the lamp house, and the condenser and objective mountings, partly broken away and in section. Fig. 5 is a front end elevation of the projector with the objective mountings removed from their supporting plates which are laterally adjustable on the movable front frame plate. Fig. 6 is an enlarged detail vertical transverse sectional view taken on the line $a$—$a$ in Fig. 4, at one of the lamp bases. Fig. 7 is a vertical transverse section taken on line $b$—$b$ in Fig. 4, through the longitudinally adjustable support for both lamps. Fig. 8 is a detail bottom plan view of one of the horizontally adjustable lamp holding plates and adjacent portions of the lamp supports.

In the illustrated and now preferred embodiment of this invention, the single self-contained lamp house 1 is divided in its larger upper part by a longitudinal partition 2 into two chambers 3, 4, which are disposed side by side in substantially the same horizontal plane. In the respective chambers 3, 4, there are placed respective light sources, 5, 6, which are preferably Mazda electric lamps. These lamps are mounted for adjustment together forward or backward as hereinafter more fully explained, relatively to two respective optical condensers 7, 8, each preferably held within a suitable mount 9, which is readily removable from its supporting open-topped segmental pocket 10 shown fixed to the front wall 11 of the lamp house. In front of the condensers 7, 8, and to their mount supporting pockets 10 is fixedly held a vertical metal plate 12 the opposite end portions of which are bent twice horizontally to form an opposed pair of pockets 13, 13, into which are slipped the opposite twice vertically grooved end sections of a wooden picture slide holder 14 having a central section which has two similar grooves at each of its opposite edges, and the holder is also preferably grooved horizontally at its bottom rail between its three vertical portions, thereby forming two picture slide receiving chambers 15, 16, each having at its opposite ends deep and shallow vertical grooves into which may be slipped from the top either the wide or the narrower slides made according to differing American and English standards of projector slide construction. A screw 17 passed through the central bar or part of the rear bellows holding plate 18 into the center plate holder section secures the holder 14 against rising in the plate pockets 13. The opposite end portions of the metal plate 18 are twice bent horizontally to form an opposed pair of pockets 19, 19, receiving the opposite ends of a removable rear plate 20 of the duplex bellows 21, 22.

It is preferred to use a horizontal intermediate plate bracket 23 having a vertical front flange 24 rising behind the bellows holding plate 18 and welded thereto, and also having a pendent rear flange 25 which is welded to a front pendent flange 26 on each condenser mount pocket 10 which has a rear pendent flange 27 welded to the front wall 11 of the lamp house 1. After the slide holder 14 is slipped downward into the plate pockets 13, 13, and rests upon the bracket 23, the holder is finally secured by the screw 17. The rear bellows holding plate 18 preferably has a forwardly projecting bottom flange 28 which is welded to a horizontal flange 29 formed on the upper front portion of a main broad bracket plate 30 the rear lower flange 31 of which is welded to the lower portion of the front wall 11 of the lamp house. The bracket 30 is about as broad as the length of the plate flange 28 and consequently gives a very strong and steady support to the condenser mount pockets 10, the slide holder 14 and the plate 18 which supports the rear end of the bellows. Obviously, the intermediate plate bracket 23 may be dispensed with so far as concerns a bottom support for the slide carrier 14, as this may rest directly upon the front flange 29 of the bracket 30, but the use of the plate bracket 23 is desirable as it affords a strong tie between the front ends of the condenser mount pockets 10 and the rear bellows supporting plate 18, while also vertically positioning the slide holder 14, and promoting convenient making and assembling and strengthening of the parts sustaining the condensers, the slide holder and the rear end of the bellows.

The front plate 32 of the duplex bellows 21, 22, is slipped downward into opposite vertical end pockets 33, 33, formed by twice horizontally bending end flange portions of a vertical front frame plate 34 which has legs 35, 35, which may rest on any support upon which the apparatus is set up for use. Horizontal flanges 36 on a pair of short angle plates 37 fixed to the inner face of the frame plate 34, form rests for the removable front plate 32 of the duplex bellows. This plate 34 which carries the two adjustable objectives, has fixed to it the front ends of two tubular rods 38, 38, which telescope within a pair of tubes 39, 39, snugly fitting holes in the front wall 11 of the lamp house 1, and having rear threaded ends which pass through its rear wall 40 and receive fastening nuts 41, 42 at opposite faces of the wall. Clamping screws 43 threaded into the front ends of the tubes 39 provide convenient means for fastening the rods 38 to the tubes at any position determined by the degree of expansion or contraction of the duplex bellows 21, 22, which may be necessary to focus the two objectives 44, 45, relatively to the coacting light condensers 7, 8, and the screen upon which images of the slide pictures or objects in the holder 14 are to be projected. Each objective is sustained within a suitable mounting 46 having an inner end flange 47 which is fixed by screws 48 to a laterally adjustable plate 49 having threaded holes 50, shown in Fig. 5, which receive the screws.

Each plate 49 has slots 51 through which easily accessible fastening screws 52 pass into the front frame plate 34. The front wall 11 of the lamp house 1, the slide holder supporting plate 12, the rear and front bellows supporting plates 18, 34, the rear and front bellows plates 20, 32, and the objective supporting plates 49, all have suitable openings 53 through which light rays from the respective lamps 5, 6, may pass through the respective condensers 7, 8, the slides in the respective holder chambers 15, 16, the respective bellows sections 21, 22, and the respective objectives 44, 45, for projecting brilliant images of the slide pictures or objects. It is unnecessary to show these light openings 53 otherwise than in the plate 12 in Fig. 1, and in the front plate 34 and in the objective supporting plates 49 in Fig. 5 of the drawings. Supplemental front feet in the form of rods 54 are passed vertically through enlarged heads of the rods 38, and screws 55 threaded into the heads provide means for fastening the rods to support the frame plate 34 and the attached objectives 44, 45, at any desired vertical adjustment relatively to the level of an opposed screen, while the lateral relative adjustment of the two objectives 44, 45, is provided for by the horizontal slots 51 in the objective supporting plates 49, and the coacting fastening screws 52 for said plates.

Special provision is made for bodily movement together of both light sources or lamps 5, 6, toward or from the condensing lenses 7, 8, and provision also is made for independently adjusting either lamp laterally to accommodate any above named lateral adjustment of the objectives 44, 45, on the front frame plate 34, and the lamps also are vertically adjustable bodily on their support to range their light rays most effectively relatively to the condensing lenses in front of them. These operative advantages are secured by the construction best shown in Figs. 2, 4, 6, 7, 8, of the drawings. The two lamps 5, 6, are adjustably supported by a sliding base plate 56 at opposite ends of which are formed guides fitting movably upon the two tubes 39 which receive the telescoping rods 38 of the projector frame. It is now preferred to provide these guides by bending downward the opposite ends of the plate 56 to form pendent outside flanges 57 taking against one side of the tube 39 and to provide a pendent flange 58 lying against the other side of the tube and formed on an angle plate 59 welded to the plate 56. It is preferred to weld to the outer face of the flange 58 a short plate 60 which with said flange provides metal of ample thickness to be bored and threaded to receive a clamping screw 61 which is passed inward freely through a long horizontal slot 62 made in the side wall of the lamp house 1 and is adapted to clamp the plate 56 immovably after the plate is adjusted along both tubes 39 to properly position the lamps relatively to the condensers 7, 8. As the plate 56 is moved forward or backward the two opposite loosened clamping screws 61 move freely in the lamp house slots 62.

Each lamp 5, 6, is vertically adjustable at its base 63 in a horizontally movable plate 64 and in a flanged collar 65 fixed to said plate. Each plate 64 is pivoted at 66 to the under side of the lamp supporting plate 56, and the opposite part of the plate 64 is movably sustained within a horizontal pocket formed in a short channel plate 67 welded at its upper flange to the plate 64 and carrying in its reinforced lower flange a thumb screw 68 which may immovably clamp the lamp holding plate 64 to the lamp supporting plate 56. As best shown in Figs. 4, 6, and 7 of the drawings, the plate 56 has an opening 69 for each lamp sufficiently larger than the diameter of the lamp base 63 to allow the base to move laterally as the lamp plate 64 is adjusted horizontally on its pivot 66, and when so adjusted to the required extent the screw 68 is tightened to clamp the plate 64 and its lamp 5 or 6 to the common adjustable lamp supporting plate 56. The collar 65 is horizontally divided part way around by a slit 70 shown in Fig. 6, and below the center of this slot the collar is vertically divided and provided with two opposing lugs 71, into which a set screw 72 is fitted. When the screw 72 is loosened the lamp base may be vertically adjusted in the collar to most effectively direct the lamp's light rays to the opposed condenser 7 or 8, and when so adjusted the lamp is secured at its base by tightening the screw 72. The lamps 5, 6, may be made relatively adjustable laterally upon the sliding plate 56 in any suitable manner, the main purpose of said lateral lamp adjustment being to range the lamps to the best advantage relatively to the two corresponding optical systems, and especially to their objectives 44, 45, when relatively adjusted laterally to assure precise coincidence of the illuminated fields they throw upon the screen in order to secure the nearest possible approximation of a true dissolving of the image projected by one objective into the image projected by the other objective as the glow of the two respective lamps gradually increases or diminishes during their alternate lighting and extinguishment.

In the operation of this projection apparatus a switch (not shown) is used to alternately light the two lamps 5, 6, by alternately switching them into the line circuit, and when one lamp is lighted the other will be extinguished. After either lamp 5 or 6 is extinguished the slide in the corresponding holder chamber 15, or 16, will be changed while the slide in the other holder chamber is being imaged on the screen. When the lamp 5 is lighted its rays pass through the condenser 7, the slide in the holder chamber 15, the bellows section 21, and the objective 44, and when the lamp 6 is lighted its rays pass through the condenser 8, the slide in the holder chamber 16, the bellows section 22, and the objective 45.

It is not essential that the removable longitudinal partition 2 be used in the lamp house but its use is desirable as it prevents the intense light rays from either lamp 5, 6, illuminating the unlighted lamp globe sufficiently to produce by its reflection through the other optical system a somewhat indistinct and undesirable image on the screen of the slide in the other chamber of the holder. For instance, should the lamp 5 be lighted its rays mainly pass through the condenser 7 and the slide in the holder chamber 15, to normally project its image upon the screen, and if the partition 2 be not used, some light rays from the lamp 5 would be reflected by the globe of the lamp 6 to and through the condenser 8 and the other slide in the holder chamber 16, to cast a faint or slightly confusing image of the latter slide upon the screen. This is prevented by the use of the partition 2 arranged between the two lamps 5 and 6.

It has been amply demonstrated that the herein described light bellows formed with independent duplex or plural collapsible bellows sections connected to a common rear plate and a common front plate, has marked advantage over a bellows having but one broad collapsible section held to rear and front plates and divided by an inside longitudinal collapsible partition into two light passages, one interposed in each optical system of the projector. It is difficult to make such a longitudinal partition light-tight and in practice it buckles laterally when the bellows is contracted thus causing the folds of the partition to laterally enter one or both of the bellows light passages and cut off marginal portions of the images being projected upon the screen. The partition also seriously interferes with close folding of the bellows during or after use of the apparatus. These more or less serious objections are entirely overcome by the bellows of this invention which in use assures absolute separation of the light rays of one optical system from those of the other optical system, and offers no obstruction to easy and close folding of the bellows. Furthermore, by fastening the front and rear ends of the plural collapsible bellows sections to common front and rear plates it is possible to slip these plates downward into opposite open-topped end pockets of the projector frame, and to instantly remove or lift out the bellows for inspection and repair, or for substitution of another bellows of the same standard construction.

In apparatus of this general class the optical systems and the lamps and their connections necessarily have considerable weight, and it therefore is most desirable to have their frame supports as light as possible consistent with the necessary strength. It is common to make various portions of a projector frame of cast iron which is heavy and easily broken and it therefore has been attempted in this invention to form portions of the frame of lighter and stronger sheet metal thereby assuring easier portability and greater durability of the entire apparatus. Special mention is therefore made of these novel sheet metal constructions which include the special form of the rear bellows holding plate 18 with open-topped end pockets 19, 19, receiving the rear end plate 22 of the light bellows and itself supported by the bracket 30 welded both to the plate 18 and to the lamp house 1, and either with or without the bracket plate 23 which if used is welded to the plate 18 and also to the sheet metal condenser lens supports 10 which are also welded to the lamp house. Special mention also is made of the transverse vertical plate 12 forming the front wall of the condenser chambers and having open-topped end pockets 13, 13, receiving the slide holder 14 and holding it in front of the condensers 7, 8. Special mention is finally made of the form of the sheet metal front frame plate 34 supporting the objectives and having opposite end pockets 33, 33, receiving the front plate 32 of the light bellows.

Having thus described my invention, what I claim and desire to secure by Letters Patent of the United States is:

1. A projection apparatus comprising a single lamp house, a plurality of light sources therein, a plurality of optical condensers respectively arranged in front of the respective light sources, a plurality of slide chambers one arranged respectively in front of each condenser, a plurality of collapsible bellows sections respectively held with their rear ends next the respective slide chambers, a movable front frame portion by which the front ends of the bellows sections are supported, and a plurality of objectives on the front frame portion in line with the respective bellows sections, slide chambers, condensers, and light sources.

2. A projection apparatus comprising a single lamp house divided by a longitudinal partition into two separate horizontally disposed chambers, two light sources one arranged in each of said chambers, two optical condensers arranged one in front of each lamp house chamber, two slide chambers arranged one in front of each condenser, two collapsible bellows sections held with their rear ends next the respective slide chambers, a movable front frame portion carrying the forward ends of the two bellows sections, and two objectives respectively held to said front frame portion in line with the respective bellows sections.

3. A projection apparatus comprising a single lamp house, two light sources therein, two optical condensers arranged one in front of each light source, two slide chambers respectively arranged in front of the condensers, a bellows comprising a single front plate, a single rear plate, and two separate collapsible tubular sections connected at their opposite ends to the front and rear plates, a movable front frame portion supporting the front plate of the bellows, and two objectives respectively held on the front plate in line with the respective bellows sections.

4. A projection apparatus comprising a single lamp house, two light sources therein, two optical condensers respectively arranged in front of the respective light sources, two slide chambers arranged in front of the respective condensers, a support next to the slide chambers having opposite end pockets open at the top, a movable front frame portion sustaining two objectives and having opposite end pockets open at the top, a bellows, and rear and front plates attached to the ends of the bellows and adapted to enter the end pockets of the two supports.

5. In projection apparatus, a bellows interposed in plural optical systems and comprising a single front plate, a single rear plate, and a plurality of collapsible bellows sections corresponding in number with the optical systems and connected at opposite ends to the respective front and rear plates.

6. In projection apparatus, a bellows interposed in two separate optical systems and comprising a single front plate, a single rear plate, and two collapsible bellows sections respectively arranged in line with the respective optical systems and connected at opposite ends to the respective front and rear plates.

7. In projection apparatus, the combination with a single lamp house and plural optical systems each having a slide chamber and light passage, of a corresponding plurality of light sources in the lamp house, and a sliding plate upon which said light sources are mounted adapted to move them together toward and from the optical systems.

8. In projection apparatus, the combination with a single lamp house and plural optical systems each comprising a slide chamber and light passage, of a corresponding plurality of light sources in the lamp house, and a sliding plate upon which said light sources are mounted adapted to move them together toward and from the optical sistems; said light sources being adjustable laterally upon the sliding plate relatively to each other and to the optical systems.

9. In projection apparatus, the combination with a single lamp house and plural optical systems each comprising a slide chamber and light passage, of a corresponding plurality of light sources in the lamp house, and a sliding plate upon which said light sources are mounted adapted to move them together toward and from the optical systems; said light sources being both laterally and vertically adjustable upon the sliding plate.

10. In projection apparatus, the combination with a single lamp house divided by a longitudinal partition into two light source chambers and two optical systems respectively fronting said chambers, each comprising a slide holder and light passage, of two light sources, one in each lamp house chamber, and a sliding plate upon which both light sources are mounted adapted to move them together toward and from the two optical systems.

11. In projection apparatus, the combination with a single lamp house, two light sources therein, two optical systems respectively fronting said light sources and each including an objective, and a slide holder and light passage interposed in each optical system, the objectives of the two optical systems being relatively adjustable laterally to assure true lateral coincidence of their fields of illumination.

12. In projection apparatus, the combination with a single lamp house, two light sources therein, two optical systems respectively fronting said light sources and each including an objective, and a slide holder and light passage interposed in each optical system, the objectives of the two optical systems being relatively adjustable laterally to assure true lateral coincidence of their fields of illumination, and means adapted to adjust the two objectives vertically together and support them.

13. In projection apparatus, the combination with a single lamp house, and two condenser mounting pockets held thereto side by side, of a plate fixed to the fronts of said mounting pockets and having end portions forming open-topped end pockets, a slide holder supported in the last named pockets, a rear bellows supporting plate held next the slide holder pockets, and a bottom bracket plate having an upper front portion sustaining the rear bellows supporting plate and the slide holder supporting plate and having a lower rear portion fastened to the front wall of the lamp house.

14. In projection apparatus, the combination with a lamp house and condenser mounting pockets having rear and front flanges and fixed at their rear flanges to the lamp house, of a plate fixed to the front flanges of said mounting supports having end portions forming pockets open at the top, a slide holder supported in the last named pockets, a rear bellows supporting plate held in front of the slide holder pockets, an intermediate bracket plate having a rear flange fixed to the front flanges of the condenser mounting pockets and forming a rest for the slide holder and also having a front flange fixed to the rear bellows supporting plate, and a main bottom bracket plate having an upper front portion sustaining the rear bellows supporting plate and the intermediate bracket plate and the slide holder and having a lower rear portion fastened to the front wall of the lamp house.

15. In projection apparatus, the combination with a lamp house, condenser mounting supports held to the front wall of the lamp house, and a slide holder sustained in front of the respective condenser mounting supports, of a supporting plate held in front of the slide holder and having end portions bent to form open-topped opposite end pockets also having a bottom horizontal flange, a bellows having a rear plate adapted to enter the pockets of said bellows supporting plate, and a bottom bracket plate having an upper front portion fastened to the bottom flange of the bellows supporting plate and having a lower rear portion fastened to the front wall of the lamp house.

16. In projection apparatus, the combination with a single lamp house having a plurality of light sources therein, a corresponding plurality of condenser mount supports and slide carrier chambers sustained in front of the lamp house, and a bellows fronting said chambers, of fixed guides in the lamp house, and a front frame plate carrying a corresponding plurality of objectives and having movable guides adjustable upon the fixed lamp house guides, said front frame plate having end portions bent to form vertical open-topped opposite end pockets receiving the front plate of the bellows.

17. In projection apparatus, the combination with a lamp house having front and rear walls, longitudinal guides passing through the house and fixed to the walls thereof, a movable front frame plate, and an objective of the projector optical system carried by the plate, of guides fixed to said front plate and movable on the lamp house guides, a plate slidably supported on the latter guides within the lamp house, and a light source mounted on the plate.

WILLIAM L. PATTERSON.